United States Patent
Zhang et al.

(10) Patent No.: US 6,687,309 B1
(45) Date of Patent: Feb. 3, 2004

(54) SYSTEM FOR ESTIMATING CARRIER FREQUENCIES OF QUADRATURE AMPLITUDE MODULATED SIGNALS HAVING HIGH SYMBOL RATES

(75) Inventors: Xiangzhou Joe Zhang, Richmond, CA (US); Robin A. Bordow, Petaluma, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 705 days.

(21) Appl. No.: 09/675,772

(22) Filed: Sep. 29, 2000

(51) Int. Cl.[7] .................................................. H04L 5/12
(52) U.S. Cl. ........................ 375/261; 375/326; 375/322
(58) Field of Search ................................ 375/261, 268, 375/269, 271, 273, 322, 323, 340, 344, 326; 455/154.1, 154.2, 157.1, 158.2, 226.4

(56) References Cited

U.S. PATENT DOCUMENTS

| | | | |
|---|---|---|---|
| 5,694,389 A | * 12/1997 | Seki et al. | ................... 370/208 |
| 6,320,917 B1 | * 11/2001 | Stott et al. | ................... 375/344 |
| 6,628,735 B1 | * 9/2003 | Belotserkovsky et al. | .. 375/355 |

FOREIGN PATENT DOCUMENTS

| | | |
|---|---|---|
| EP | 0 765 060 | 9/1996 |
| EP | 1 102 447 | 11/2000 |
| WO | WO 01/15400 | 8/2000 |

OTHER PUBLICATIONS

Search Report Under Section 17 dated Apr. 10, 2002.
Edward A. Lee & David G. Messerschmitt; Digital Communication—Second Edition; "Timing Recovery Performance" pp. 741–748.

* cited by examiner

Primary Examiner—Shuwang Liu
Assistant Examiner—Kevin Kim
(74) Attorney, Agent, or Firm—John L. Imperato

(57) ABSTRACT

A first system includes a converter, complex signal generator, exponentiator, FFT module and processor to estimate carrier frequency of a high symbol rate quadrature amplitude modulated (QAM) signal relative to a target carrier frequency. The converter converts the applied QAM signal to an intermediate frequency (IF) signal and digitizes the IF signal at a predesignated sample rate. The complex signal generator extracts a real component of the digitized IF signal, provides an imaginary component of the digitized IF signal and then combines the real component and the imaginary component in a complex signal. The exponentiator, raises the complex signal to a predesignated power and the FFT module performs a Fast Fourier Transform (FFT), having a predetermined number of samples, on the complex signal as raised to the predesignated power. The processor, takes the magnitude of the resulting FFT, extracts the index of a sample within the resulting FFT having the greatest magnitude and estimates the carrier frequency of the applied QAM signal relative to a target carrier frequency based on the predesignated power, the extracted index and the predesignated sample rate. In a second system a quadrature downconverter replaces the complex signal generator.

20 Claims, 1 Drawing Sheet

SYSTEM FOR ESTIMATING CARRIER FREQUENCIES OF QUADRATURE AMPLITUDE MODULATED SIGNALS HAVING HIGH SYMBOL RATES

BACKGROUND OF THE INVENTION

Modern communication systems process quadradrature phase shift keyed (QPSK) signals, and other types of quadrature amplitude modulated (QAM) signals, that have high symbol rates. For example, symbol rates within the QPSK signals of code domain multiple access (CDMA) systems presently exceed one million symbols per second. At these high symbol rates, accurately identifying the carrier frequencies of the modulated signals is difficult.

Due to the difficulty in identifying carrier frequencies, measurement instruments that monitor code domain power (CDP), modulation accuracy and other critical performance measures of communication systems rely on estimates that the carrier frequency of the modulated signals fall within a specified offset range relative to a target carrier frequency. However, when the carrier frequency falls outside the specified offset range, the measurement instruments are unable to accurately and reliably monitor the communication systems. For presently available measurement instruments, this specified offset range is as narrow as +/-1 KHz, making these measurement instruments unsuitable for monitoring base stations, mobile phones and other portions of communication systems in which the carrier frequencies deviate from the target carrier frequencies by large frequency offsets. Were estimates of carrier frequency accurately made, compensation for the large frequency offsets would enable the measurement instruments to accurately and reliably monitor communication systems.

Accordingly, there is a need for a system that accurately estimates carrier frequencies of QAM signals having high symbol rates—even when the carrier frequency occurs at large frequency offsets relative to the specified target frequency.

SUMMARY OF THE INVENTION

Systems constructed according to the preferred embodiments of the present invention accurately estimate carrier frequency of quadrature amplitude modulated (QAM) signals that have high symbol rates.

A first system, constructed according to the first preferred embodiment of the present invention, includes a converter, complex signal generator, exponentiator, FFT module and processor to estimate carrier frequency of a QAM signal relative to a target carrier frequency. The converter converts the applied QAM signal to an intermediate frequency (IF) signal and digitizes the IF signal at a predesignated sample rate. The complex signal generator receives the digitized IF signal, extracts a real component of the digitized IF signal and performs a Hilbert Transform on the extracted real component to provide an imaginary component of the digitized IF signal. The complex signal generator then combines the real component and the imaginary component in a complex signal. The exponentiator, raises the complex signal to a predesignated power and the FFT module performs a Fast Fourier Transform (FFT), having a predetermined number of samples, on the complex signal as raised to the predesignated power. The processor, takes the magnitude of the resulting FFT, extracts the index of a sample within the resulting FFT having the greatest magnitude and estimates the carrier frequency of the applied QAM signal relative to a target carrier frequency based on the predesignated power, the extracted index and the predesignated sample rate.

A second system, constructed according to the second preferred embodiment of the present invention, includes a converter, a quadrature downconverter, an exponentiator, FFT module and processor to estimate carrier frequency of a QAM signal relative to a target carrier frequency. The converter converts the QAM signal to an IF signal and digitizes the IF signal. The quadrature downconverter, receives the digitized IF signal, extracts a baseband in-phase component of the digitized IF signal, extracts a baseband quadrature component of the digitized IF signal and generates a complex signal from the baseband in-phase component and the baseband quadrature component. The exponentiator, raises the complex signal to a predesignated power and the FFT module, performs a FFT, having a predetermined number of samples, on the complex signal as raised to the predesignated power. The processor takes the magnitude of the resulting FFT, extracts the index of a sample within the resulting FFT having the greatest magnitude and estimates the carrier frequency of the applied QAM signal relative to a target carrier frequency based on the predesignated power, the extracted index and the predesignated sample rate.

DETAILED DESCRIPTION OF THE PREFERRED EMBODIMENT

Figure 1:
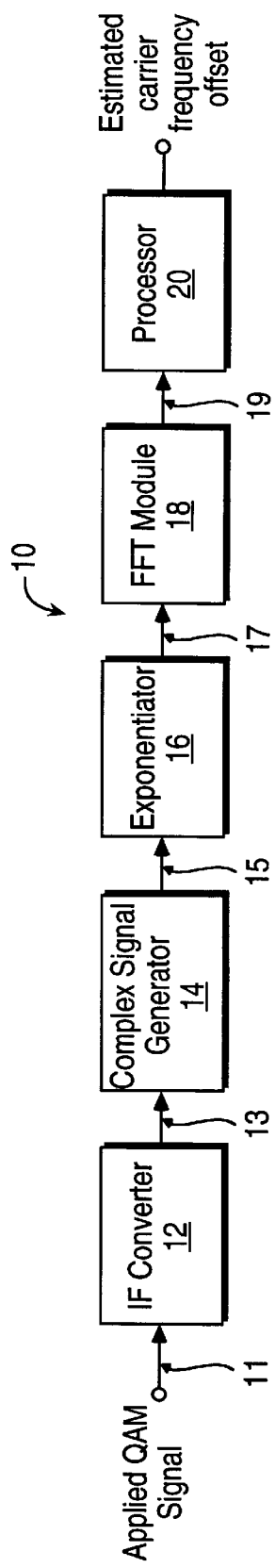
FIG. 1 shows a first system for estimating carrier frequency of a high symbol rate QAM signal, constructed according to a first preferred embodiment of the present invention.

FIG. 1 shows a system 10 for estimating carrier frequency of a QAM signal 11 having high symbol rates, constructed according to the first preferred embodiment of the present invention. The signal 11 is applied to an intermediate frequency (IF) converter 12. When the symbol rate of the signal 11 exceeds several hundred thousand symbols per second, the carrier frequency of the signal 11 is not readily identifiable. For example, a QPSK signal within a code domain multiple access (CDMA) system (not shown) has a symbol rate in excess of one million symbols per second which makes the carrier frequency of the QPSK signal difficult to identify. Typically, the carrier frequency of the QPSK signal in the CDMA system is offset in frequency relative to a target carrier frequency that is specified according to CDMA system standards. CDMA system standards also specify an associated symbol rate, or chip rate, R. When the QAM signal 11 is provided by a CDMA system, for example, the chip rate R is 1.2288 Mchips/sec. However, alternative chip rates are also compatible with the preferred embodiments of the present invention.

The IF converter 12 frequency-translates the applied QAM signal 11 to provide an IF signal at an IF frequency $F_{IF}$. The IF converter 12 then digitizes the IF signal at a sampling ratio N, so that a digitized IF signal 13 sampled at a sampling rate N*R results at the output of the IF converter 12. The sampling rate N*R of this digitized IF signal 13 is sufficiently high to accurately represent the IF signal. Typically, $N \geq 2$. In this example, the sampling ratio N is equal to four, resulting in sampling rate N*R, equal to four times the symbol rate R. This provides a digitized IF signal 13 having 4.9152 Msamples/sec at the output of the IF converter 12 in the example where the symbol rate, or chip rate, R=1.2288 Mchips/sec. The frequency $F_{IF}$ of the IF signal within the IF converter 12 equals X/4 times the sampling rate N*R, where X is an odd integer. In this example, X is set to three, resulting in the IF frequency $F_{IF}$ being equal to 3.6864 MHz.

When the IF converter 12 provides a complex IF signal having both a real component and an imaginary component, the digitized IF signal 13 is a complex signal 15 that is provided to an exponentiator 16. However, to minimize signal processing within the IF converter 12, the IF converter typically provides a real IF signal and the digitized IF signal 13 has only a real component. Under this condition, a complex signal generator 14 receives this digitized IF signal 13 from the IF converter 12 and generates the corresponding complex signal 15. A Hilbert Transformer (not shown) included in the complex signal generator 14 provides an imaginary component of the complex signal 15 from the real digitized IF signal 13. The complex signal 15 results from combining the real digitized IF signal 13 with the imaginary component provided by the Hilbert Transformer.

The exponentiator 16 receives the complex signal 15 from the complex signal generator 14 under condition that the IF converter 12 provides a real digitized IF signal 13. Under condition that the IF converter 12 provides a complex digitized IF signal 13, the exponentiator receives the complex signal 15 from the IF converter 12 directly (not shown). The exponentiator then raises the complex signal 15 to the Mth power, where M is an integer equal to four or eight. This exponentiation of the complex signal 15 to the Mth power causes the target carrier frequency of the applied QAM signal 11 to be translated to a zero hertz, or DC, spectral position. The carrier frequency is offset from the DC spectral position under condition that the carrier frequency deviates from the target carrier frequency. In this example, the exponentiator 16 raises the complex signal 15 to the fourth power.

An FFT module 18 receives the exponentiated complex signal 17 from the exponentiator 16 and performs a Fast Fourier Transform, or FFT, on the signal 17 using a predetermined number of samples S. A resulting FFT 19 at the output of the FFT module 18 is processed by a processor 20 that extracts the magnitude of samples in the resulting FFT 19 and identifies a sample in the FFT 19 having the greatest magnitude. From a corresponding index I of the sample having the greatest magnitude, the estimated carrier frequency offset $F_{OS}$ is extracted according to the following relationship:

$$F_{OS}=(1/M)*(I/S)*N*R$$

where M, I, S, N and R are as previously defined.

In the example where the sampling ratio N=4, where the exponentiated power M=4, where the size or predetermined number of samples S of the FFT equals 8192, and where the chip rate R=1.2288 Mchips/sec, the estimated carrier frequency $F_{OS}$=0.25×I/8192*(4.9152 MHz). This results in an estimated carrier frequency that is accurate to +−150 Hz and a frequency offset estimation range of approximately +−200 KHz. Generally, the accuracy of the estimated carrier frequency of the applied QAM signal 11 increases as the size S of the FFT increases.

Figure 2:
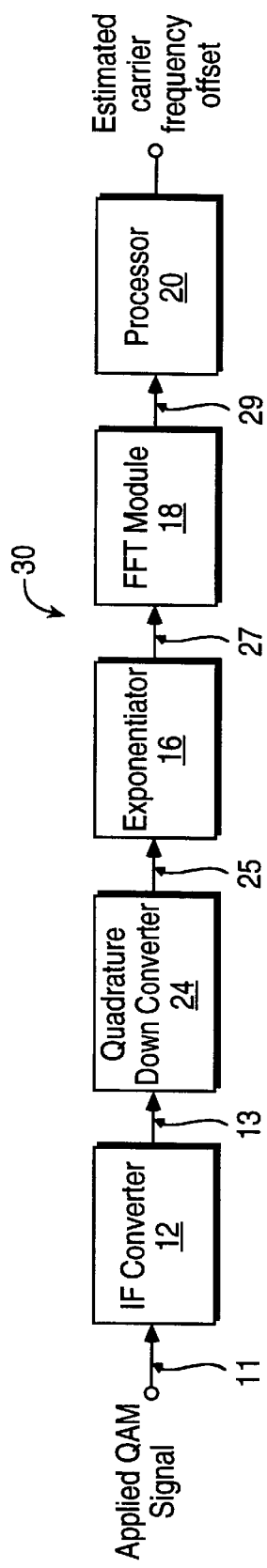
FIG. 2 shows a second system for estimating carrier frequency of a high symbol rate QAM signal, constructed according to a second preferred embodiment of the present invention.

FIG. 2 shows a system 30 for estimating carrier frequency of the QAM signal 11, constructed according to the second preferred embodiment of the present invention. The second embodiment differs from the first embodiment in that in the second preferred embodiment the digitized IF signal 13 is applied to a quadrature downconverter 24 that mixes the digitized IF signal 13 with a signal at the IF frequency $F_{IF}$ having quadrature signal components. The quadrature downconverter 24 translates the digitized IF signal 13 to a baseband signal and extracts a baseband in-phase (I) component and baseband quadrature (Q) component of a complex signal 25. The baseband I component establishes the real component of the complex signal 25 and the baseband Q component establishes the imaginary component of the complex signal 25. The sum of the baseband I component and the baseband Q component, I+jQ, forms the complex signal 25 that is then applied to the exponentiator 16, resulting in an exponentiated signal 27, $(I+jQ)^M$, where M is an integer equal to four or eight. The exponentiated signal 27 is then applied to the FFT module 18 and a resulting FFT 29 is applied to the processor 20. The processor 20 estimates the carrier frequency offset from the corresponding index I of the sample in the resulting FFT 29 having the greatest magnitude.

Once carrier frequency offset $F_{OS}$ is determined in the preferred embodiments of the present invention, the carrier frequency of the applied QAM signal 11 is estimated by adding the carrier frequency offset to the target carrier frequency. The systems 10, 30 are implemented using analog or digital hardware, digital signal processors, software, firmware or by using combinations of these technologies.

While the preferred embodiments of the present invention has been illustrated in detail, it should be apparent that modifications and adaptations to these embodiments may occur to one skilled in the art without departing from the scope of the present invention as set forth in the following claims.

What is claimed is:

1. A system for estimating carrier frequency of an applied QAM signal relative to a target carrier frequency, comprising:

a converter, converting the applied QAM signal to an IF signal and digitizing the IF signal at a predesignated sample rate;

a complex signal generator, receiving the digitized IF signal, extracting a real component of the digitized IF signal and performing a Hilbert Transform on the extracted real component to provide an imaginary component of the digitized IF signal, the complex signal generator combining the real component and the imaginary component in a complex signal;

an exponentiator, raising the complex signal to a predesignated power;

an FFT module, performing a FFT, having a predetermined number of samples, on the complex signal as raised to the predesignated power; and a processor, taking the magnitude of the resulting FFT, extracting the index of a sample within the resulting FFT having the greatest magnitude and estimating the carrier frequency of the applied QAM signal relative to a target carrier frequency based on the predesignated power, the extracted index, the predetermined number of samples and the predesignated sample rate.

2. The system of claim 1 wherein the applied QAM signal has a symbol rate and the predesignated sample rate is at least two times the symbol rate.

3. The system of claim 2 wherein the predesignated sample rate is an integer multiple of the symbol rate.

4. The system of claim 1 wherein the IF signal is at a frequency equal to X/4 times the predesignated sample rate, where X is a positive odd integer.

5. The system of claim 2 wherein the IF signal is at a frequency equal to X/4 times the predesignated sample rate, where X is a positive odd integer.

6. The system of claim 1 wherein the predesignated power equals one of four and eight.

7. The system of claim 1 wherein the estimated carrier frequency is offset from the target carrier frequency by the reciprocal of the predesignated power times the predesignated sample rate times the ratio of the extracted index to the predesignated number of samples.

8. A system for estimating carrier frequency of an applied QAM signal relative to a target carrier frequency, comprising:
    a converter, converting the applied QAM signal to a complex IF signal and digitizing the complex IF signal at a predesignated sample rate;
    an exponentiator, raising the complex IF signal to a predesignated power;
    a FFT module, performing a FFT, having a predetermined number of samples, on the complex IF signal as raised to the predesignated power; and
    a processor, taking the magnitude of the resulting FFT, extracting the index of a sample within the resulting FFT having the greatest magnitude and estimating the carrier frequency of the applied QAM signal relative to a target carrier frequency based on the predesignated power, the extracted index, the predetermined number of samples and the predesignated sample rate.

9. The system of claim 8 wherein the applied QAM signal has a symbol rate and the predesignated sample rate is at least two times the symbol rate.

10. The system of claim 9 wherein the predesignated sample rate is an integer multiple of the symbol rate.

11. The system of claim 9 wherein the IF signal is at a frequency equal to X/4 times the predesignated sample rate, where X is a positive odd integer.

12. The system of claim 8 the predesignated power equals one of four and eight.

13. The system of claim 8 wherein the estimated carrier frequency is offset from the target carrier frequency by the reciprocal of the predesignated power times the predesignated sample rate times the ratio of the extracted index to the predesignated number of samples.

14. A system for estimating carrier frequency of an applied QAM signal relative to a target carrier frequency, comprising:
    a converter, converting the applied QAM signal to an IF signal and digitizing the IF signal;
    a quadrature downconverter, receiving the digitized IF signal, extracting a baseband in-phase component of the digitized IF signal, extracting a baseband quadrature component of the digitized IF signal and generating a complex signal from the baseband in-phase component and the baseband quadrature component;
    an exponentiator, raising the complex signal to a predesignated power;
    an FFT module, performing a FFT, having a predetermined number of samples, on the complex signal as raised to the predesignated power; and
    a processor, taking the magnitude of the resulting FFT, extracting the index of a sample within the resulting FFT having the greatest magnitude and estimating the carrier frequency of the applied QAM signal relative to a target carrier frequency based on the predesignated power, the extracted index, the predetermined number of samples and the predesignated sample rate.

15. The system of claim 14 wherein the applied QAM signal has a symbol rate and the predesignated sample rate is at least two times the symbol rate.

16. The system of claim 15 wherein the predesignated sample rate is an integer multiple of the symbol rate.

17. The system of claim 14 wherein the IF signal is at a frequency equal to X/4 times the predesignated sample rate, where X is a positive odd integer.

18. The system of claim 15 wherein the IF signal is at a frequency equal to X/4 times the predesignated sample rate, where X is a positive odd integer.

19. The system of claim 14 wherein the predesignated power equals one of four and eight.

20. The system of claim 14 wherein the estimated carrier frequency is offset from the target carrier frequency by the reciprocal of the predesignated power times the predesignated sample rate times the ratio of the extracted index to the predesignated number of samples.

* * * * *